UNITED STATES PATENT OFFICE.

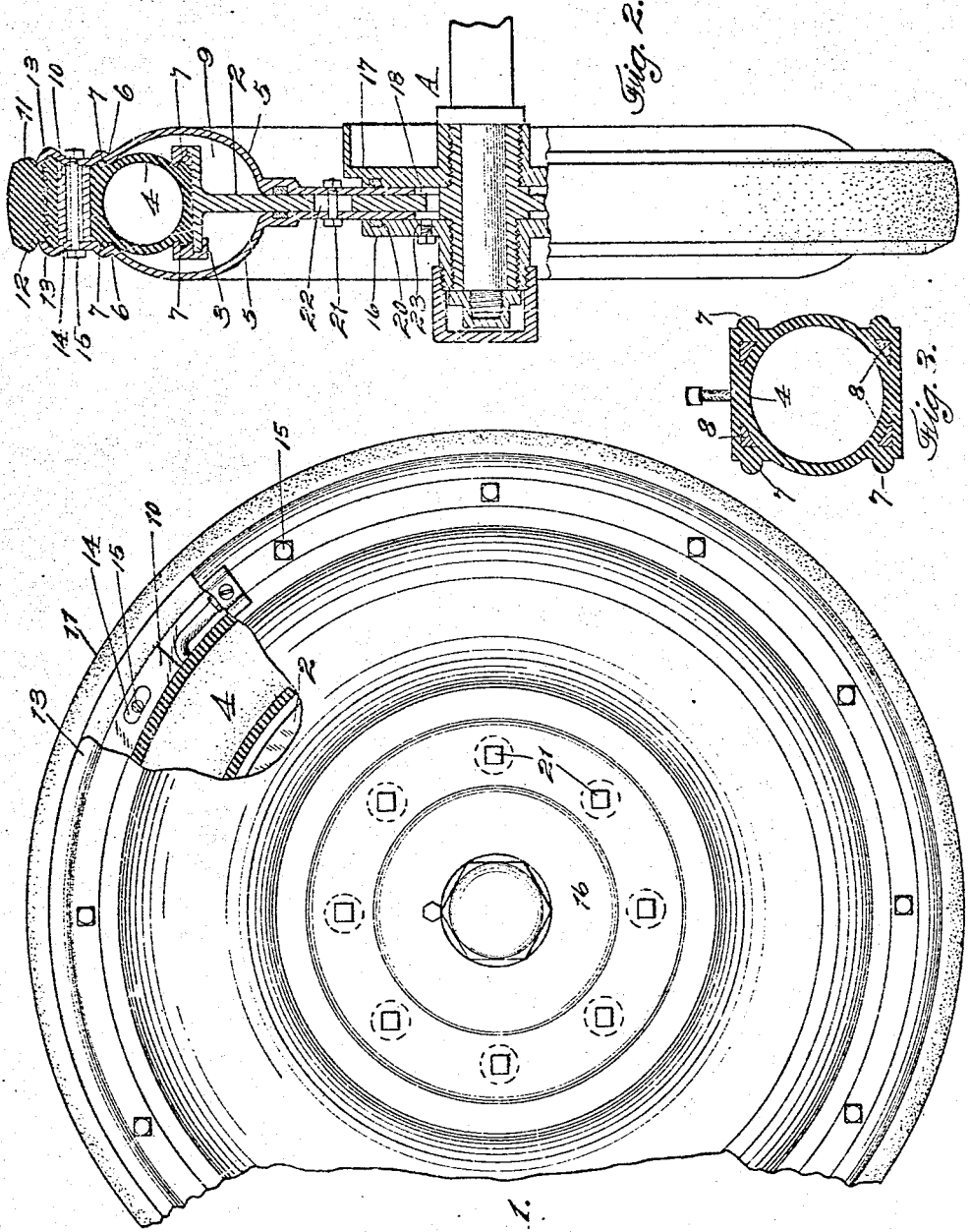

EDWIN S. SHANKLIN, OF OAKLAND, CALIFORNIA.

RESILIENT WHEEL.

986,948.  Specification of Letters Patent.  Patented Mar. 14, 1911.

Application filed May 6, 1909. Serial No. 494,370.

*To all whom it may concern:*

Be it known that I, EDWIN S. SHANKLIN, citizen of the United States, residing at Oakland, in the county of Alameda and State of California, have invented new and useful Improvements in Resilient Wheels, of which the following is a specification.

My invention relates to a cushion vehicle wheel.

The object of the invention is to provide a simple, practical wheel which will have all the resilient qualities of the ordinary puncturable pneumatic wheel, without any of the dangers or annoyances incident to the use of the latter.

The invention consists of the parts and the construction and combination of parts as hereinafter more fully described and claimed, having reference to the accompanying drawings, in which—

Figure 1 is a side elevation partially in section. Fig. 2 is an edge view of the wheel, the upper portion being in section. Fig. 3 is a cross section through the inner tube.

A represents the hub of my improved wheel having secured thereto the disk or plate 2 which performs the functions of the usual spokes. To the outer edges of this disk is rigidly secured the detachable rim 3, carrying the detachable tire 4. This tire is of peculiar construction and may be of the single tube variety, as here shown. As here shown this tire is entirely housed within the rigid protective plates 5, and does not come in contact with the ground at any time, or at any place, and its outside or tread portion is flanged and reinforced so as to be gripped by the bent jaw portions 6 of the plates 5, just as the opposite side of the tire is gripped and held by the rim 3; in other words, this tire is formed with a flat inner portion and a flat outer portion, each having the laterally extending flanges 7, with the corner portion of these flange members reinforced by the usual hard rubber ring 8.

The plates 5 are formed with a bulge indicated by the inclosed chamber 9 to house in the tire and rim; the plates being brought toward each other again toward the outside to form the gripping jaws 6, and are secured to the outer solid metal rim 10; on the outside of which rim rests the solid rubber or non-puncturable resilient tire 11. If desired this tire 11 may be reinforced by wires 12.

The outside edges of the plates are bent to form opposed hook members 13, which grip the tire 11 and hold it in place on the rim 10.

The rim is provided with enlarged transverse perforations 14 at intervals, through which perforations and through the opposed plates 5, are passed the bolts 15 by which the plates 5 are rigidly bolted to the rim 10.

The edges of the plates adjacent to the hub are bent to lie flat, and to slide upon the spoke plate 2, and between the latter and the hub flanges 16—17; there being a space 18 around the hub and on each side of the spoke plate 2, and between the hub and the inner edges of the sliding portions of the plates 5, to accommodate these plates in their inward or upward movement as the wheel travels over the ground.

One of the distinguishing features of this wheel is that the protective plates 5 are secured to the outer rim 11 and slide in suitable boxes 18 adjacent to the hub; consequently it is practically impossible for any dust or dirt to get into the tire, particularly as the packing rings 20 are provided at suitable points between the contiguous parts of the plates 5 and 2. This construction also makes it possible to lubricate the moving plates, as the packing rings keep the lubricant in, as well as keeping dust out.

21 are bolts passing through the plates 5, and working in holes 22, and the spoke plate 2; these bolts 21 being designed to hold the side plates snug against the spoke plate, and give rigidity to the structure.

The boxes 18 may be lubricated through a suitably plugged opening 23.

Thus the inside of the tire is gripped by the rim 3 and the outside is gripped at 6 so as to be rigidly connected with the tread portion 11, the full tractive force of the wheel is preserved, and at the same time all the resilient qualities of the use of a pneumatic tube, as 4, is obtained.

Having thus described my invention, what I claim and desire to secure by Letters Patent is—

1. In a vehicle wheel, the combination of a hub having two spaced annular flanges thereon adjustable toward and from each other, said hub having a fixed disk in a plane at right angles to the hub and between the flanges and spaced therefrom, side plates housing in the disk and slidable between the flanges, means for holding the side plates to the disk to permit a limited rotary and turning movement of the plates in respect to the disk, an annular cushion between the outer edge of the disk and said plates, a solid tread member, said side plates having annular corrugations adjacent to their outer perimeters to provide jaws between which the tread member and cushion are gripped, and means for clamping the corrugated portions of said plates to the tread member and cushion.

2. The combination of a hub having two spaced annular flanges thereon adjustable toward and from each other, said hub having a fixed disk in a plane at right angles to the hub and between the flanges and spaced therefrom, side plates housing in the disk and slidable between the flanges, a resilient cushion comprising a single tube with outer and inner gripping flanges, the inner gripping flanges gripped by means carried by the outer edge of the disk, and the outer flanges grasped in annular corrugations in said side plates adjacent to their outer perimeters, an outside annular tread member, a solid rim ring between the tread member and cushion, said side plates having their outer edges annularly corrugated to provide jaws between which said tread member is gripped, and draw-bolts passing through the plates and through perforations in said rim ring between the said cushion and tread.

3. In a vehicle wheel, the combination of a hub, a radial disk secured thereto, an inflatable tire made in one piece with a double set of gripping flanges, the perimeter of the disk having means for gripping one set of said flanges, side plates embracing the disk and slidable thereon, bolts passing through the side plates and through perforations in the disk to hold the plates together and permit them to have a limited sliding movement in unison on the disk, said plates having annular, oppositely arranged bulges to accommodate said tire, and said plates beyond the bulge having each a double row of concentric corrugations, the inner set of said corrugations on the two plates forming jaws to grip the outer set of said gripping flanges on said tire, an outside annular tread-member gripped by the outer set of said annular corrugations on the two plates, a perforated ring rim between said tire and the outer tread member, and draw bolts passing through the plates between said double rows of corrugations simultaneously to grip both the inside tire and the outer tread member.

4. In a vehicle wheel, the combination of a hub with screw-threaded ends and having a radially projecting disk secured thereto between its ends, a flange screwing on to each end of the hub and adjustably spaced from said disk, a side plate on each side of the disk and slidable thereon, said side plates having a limited movement in the spaces provided between said flanges and disk, means for holding the side plates to the disk to permit a limited radial and turning movement of the plates in unison with respect to the disk, annular packings between said flanges and the respective side plates, other annular packings between the side plates and said radial disk, an annular cushion gripped between the outer edge of the disk and said plates, and an annular tread member carried by the plates.

In testimony whereof I have hereunto set my hand in presence of two subscribing witnesses.

EDWIN S. SHANKLIN.

Witnesses:
CHARLES A. PENFIELD,
CHARLES EDELMAN.